United States Patent [19]

Hell et al.

[11] Patent Number: 4,906,827

[45] Date of Patent: Mar. 6, 1990

[54] APPARATUS FOR AUTOMATICALLY CANCELLING BANK NOTES

[75] Inventors: Wilhelm Hell, Mering; Herbert Bernardi, Haag d.d. Amper, both of Fed. Rep. of Germany

[73] Assignee: GAO Gesellschaft fur Automation und Organisation mbH, Munich, Fed. Rep. of Germany

[21] Appl. No.: 267,278

[22] Filed: Nov. 4, 1988

[30] Foreign Application Priority Data

Nov. 6, 1987 [DE] Fed. Rep. of Germany ....... 3737802

[51] Int. Cl.$^4$ .............................................. G06F 15/30

[52] U.S. Cl. ..................................... 235/379; 235/449

[58] Field of Search ................................ 235/379, 449

[56] References Cited

U.S. PATENT DOCUMENTS 4,837,426 6/1989 Pease .................................. 235/449

FOREIGN PATENT DOCUMENTS 2446280 4/1975 Fed. Rep. of Germany .

2921862 12/1979 Fed. Rep. of Germany .

*Primary Examiner*—Howard I. Pitts

*Attorney, Agent, or Firm*—Bacon & Thomas

[57] ABSTRACT

An apparatus for automatically cancelling bank notes comprises an ink jet printer which provides cancellation markings on bank notes in contactless fashion. A marking sensor which checks the presence of the markings is protected, along with the ink jet printer, against unauthorized access.

11 Claims, 3 Drawing Sheets

APPARATUS FOR AUTOMATICALLY CANCELLING BANK NOTES

BACKGROUND OF THE INVENTION

The present invention relates to an apparatus and a method for automatically canceling (demonetizing) bank notes, comprising a transport system for the singled bank notes and a printing unit integrated into the transport system in the form of an ink jet printer which provides markings on the bank notes to be canceled.

Bank notes do not have unlimited life. After a certain period of circulation, during which their condition is periodically checked, they are withdrawn from circulation and destroyed. The bank notes to be destroyed must first be canceled if they are not sorted out and destroyed at the same place, in order to prevent manipulation on the transport route between sorting and destruction. It is known in this connection to cancel by perforations or to invalidate by an overprint.

It is known from DE-OS 29 21 862 to integrate into a machine for automatic quality control of newly printed bank notes a printing unit for printing a visible marking on faulty notes. A sorting apparatus for bank notes known from DE-AS 24 46 280 also has a stamping means integrated into the apparatus for providing a cancellation marking on bank notes no longer fit for circulation. The marking is again provided in contacting fashion by a die.

This known contacting mode of cancellation has a number of disadvantages. Stamping impairs the transport of the bank notes running through the corresponding machines at high speed. There is a danger of a bank note jam or of a brief delay of the bank notes, which alters clock intervals and interferes with the orderliness of subsequent processing in the machine. The known printing units also require special fast-drying inks which dry on the bank notes extremely quickly but most not dry up on the printing rolls. If the ink on the bank notes is not dry enough, the transport path following the printing units is often soiled, which increases the need for servicing in the transport system and possibly increases the wear of machine parts. Due to the space required by the known printing units, a change-over to different bank note formats or a change in the markings is barely possible, or at least very troublesome, involving a more or less elaborate resetting of the printing means itself.

A fundamental problem that arises in all machines for processing bank notes consists in the absolute necessity of preventing unauthorized access to the transport path of the bank notes for purposes of manipulation. Such manipulation could be, for example, channeling in false bank notes and removing genuine ones, or putting the printing unit out of action and later removing falsely uncanceled bank notes during the further processing of the "canceled bank notes," that may take place with lesser security effort. A need therefore exists for a printing apparatus for canceling bank notes which is free from these disadvantages of contacting-type printing units and in particular solves the security problems.

This problem is solved according to the invention by the combination of the features stated in the main claim.

OBJECTS OF THE INVENTION

The invention does not consist in merely replacing a contacting-type printing apparatus by an ink jet printer, but solves the security problem by inserting a marking sensor after the ink jet printer and placing both the sensor and the ink jet printer, on the nozzles thereof, in a common housing.

Compared to conventional printing units, the use of the ink jet printer has the advantages that it is of relatively small, compact and robust construction and has variable fonts. Since it operates in contactless fashion, it allows for printing without any risk of bank note jams or bank note delays. The use of extremely fluid, very fast-drying inks, which can be applied by ink jet printing systems in very easily dosable, small amounts, allows for bank notes to be canceled by markings which are of very high security value. This is due to the fact that the great fluidity of the inks causes them to penetrate especially deep into the volume of the paper, so that they cannot be removed without destroying the bank notes or the printed pattern. The fast drying of the inks within a fraction of a second furthermore prevents the transport system from being soiled, thereby improving the serviceability of the machine and avoiding increased wear of the machine parts involved.

The invention reliably prevents manipulation of the cancellation apparatus. The immediate check of the cancellation on the bank note allows for all necessary protection measures to be initiated at once, if necessary. Such security measures may involve picking out such bank notes and then testing them specially (subsequent hand labor) or stopping the machine to allow for a check by the machine operator's superior. In spite of the high security, the technical effort required therefor can be kept low, since the cancellation markings can be checked most simply by light barriers directed to the cancellation tracks which check the correctness of present/absent markings on the particular bank notes and in the particular cancellation tracks.

SUMMARY OF THE INVENTION

The protection measures are completed by a housing that takes up the sensor and the ink jet printer. The housing can only be opened by authorized persons, so that no one can put the ink jet printer out of action or manipulate the succeeding sensor.

Protection in the described form is also possible by taking corresponding measures on the bank note processing machine itself, if these measures reliably prevent unauthorized access to the cancellation unit.

Security is increased further if the ink jet printer is preceded by a second marking sensor which detects, for example, authenticity and intactness or, at this time, the absence of cancellation markings on bank notes unfit for circulation. By comparing the signal from this preceding marking sensor with the sensor succeeding the ink jet printer, one can reliably detect, firstly, that authentic bank notes have been canceled at the intended place by the machine (and not already before) and, of course, also that the cancellation apparatus itself is functioning properly.

Due to the technical possibilities of ink jet printers, the markings can be applied in almost any desired form. For example, they may consist of straight or wavy lines, series of dots, etc. The markings may also contain clear or coded information on the place, the time and the canceling machine, for example. In this case it may be advantageous to apply the cancellation marking in the form of a bar code. The marking can in particular also be designed in such a way that the cancellation is clear to anyone afterwards but the authenticity of the bank note can still be clearly tested.

One can also increase the reliability of cancellation in particular by disposing nozzles on each side of the bank note running through the ink jet printer. This makes it possible to provide the bank note with the same or different cancellation markings on each side. The tracks that preferably overlap at least partly on the front and back mean that the volume of the paper substance is impregnated more or less completely with the ink, so that it is virtually impossible to remove the markings without destroying the paper. Also, since the arrangement of nozzles on each side of a bank note doubles the writing area and their parallel operation doubles the writing speed, it is possible to provide the bank note with further information, such as a serial number or the like, which cannot be realized by one-sided marking with conventional printing units due to a lack of space or writing time.

The structure of an ink jet printer makes it possible to dispose only the nozzles at the intended place of cancellation in very little space in the transport system, while the peripheral devices such as tanks, control means, etc., can be housed in the machine casing a distance away from the transport system. The resulting extremely compact construction allows for a double nozzle system, so that if individual nozzles malfunction the corresponding nozzles of the second system can be easily switched on. This also makes it possible in many cases to retrofit machines with a cancellation apparatus, even if the machine construction is very compact. Furthermore, one can additionally increase the unit's reliability of operation by providing stand-by nozzles.

BRIEF DESCRIPTION OF THE DRAWINGS

In the following, the invention shall be explained in more detail with reference to the adjoined drawing, in which.

DESCRIPTION OF THE PREFERRED EMBODIMENT

Figure 1:
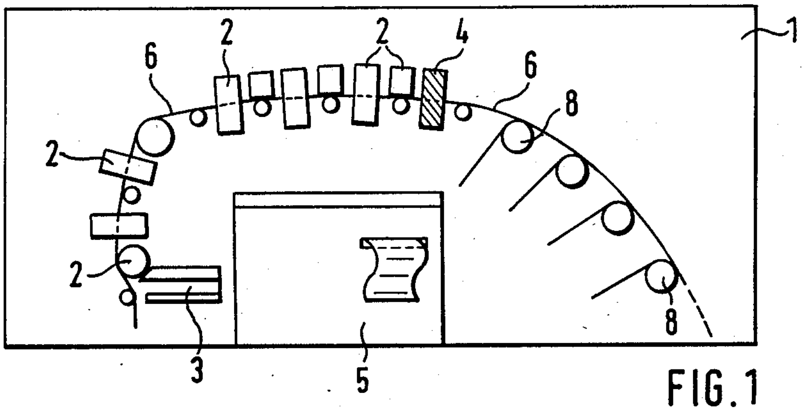
FIG. 1 shows a schematic view of an apparatus for sorting bank notes

The bank note sorting machine shown very schematically in FIG. 1 comprises a mounting frame 1 to which the individual modules of the system are attached. The bank notes are singled stack by stack by module 3 and fed into curved transport path 6. The bank notes run through various sensor modules 2 which test, for example, their authenticity and their condition. Finally, they are deposited in one of stacker units 8, depending on the test result, and removed from there for further use. The functioning of the total system is monitored by a computer 5 which is also connected to appropriate input and output units for operating the machine and recording all special incidents.

The module referred to by number 4 is a cancellation apparatus according to the invention. The module is included in the transport system and contains at least the nozzles of an ink jet printer, and a sensor for detecting the cancellation markings applied.

In the embodiment shown, bank notes which are no longer fit for circulation, for example, are to be provided with a corresponding marking. The decision whether or not a bank note is still fit for circulation is made by one of sensors 2. Since all bank notes run through the cancellation means, the latter must always be driven when a bank note recognized as being unfit for circulation passes through the means.

The structure of the cancellation apparatus shall be explained with reference to FIGS. 2 and 3. Bank notes 7 are transported by means of transport belts 8 in a narrow gap through housing 9 of the cancellation apparatus. Nozzles 10 of the ink jet printing system are disposed on each side of the transport gap. In the present example, the ink reservoir is located outside the actual module at an appropriate place in the machine. However, if there is sufficient space in the sensor housing the ink container can, in another variation, also be housed in the sensor housing.

Each of nozzles 10 communicates with the ink reservoir via supply lines 14. Each nozzle contains a mechanical pulse generator 13 which allows for acceleration of individual ink drops. In the present example, this is a piezoelectric element that effects a discharge of ink when driven by an appropriate pulse. However, other ink jet systems known from printing technology are equally conceivable. The mode of operation of ink jet printers is known, so that it need not be dealt with in any detail here.

In this embodiment, nozzles 10 are disposed on each side of bank notes 7 so as to be opposite each other. When operated simultaneously, cancellation markings are thus produced on both sides of the bank note which overlap at least in part.

Figure 2:
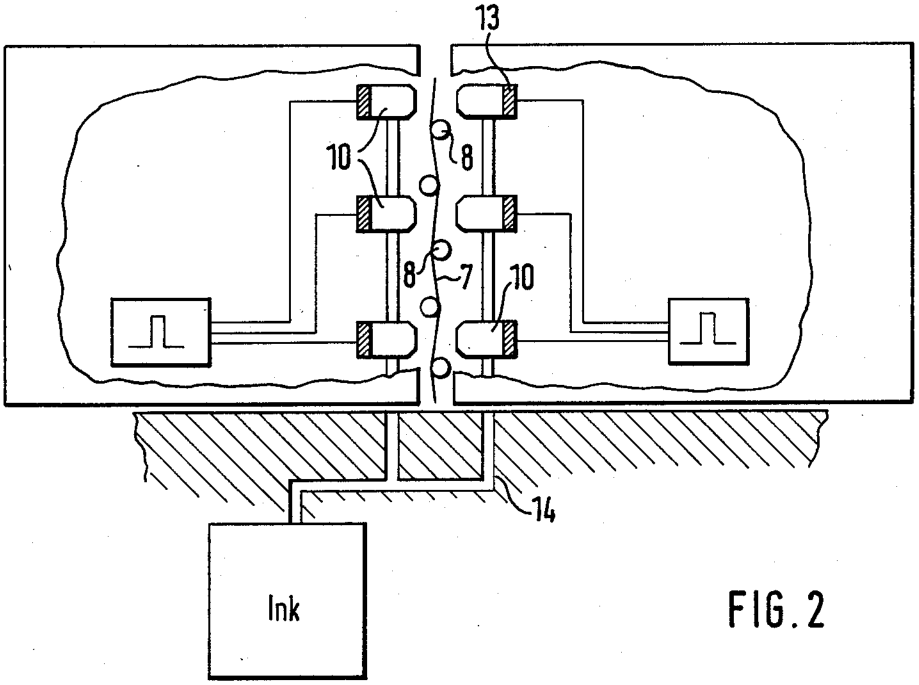
FIG. 2 shows a sectional view of the apparatus for canceling bank notes in a schematic view
Figure 3:
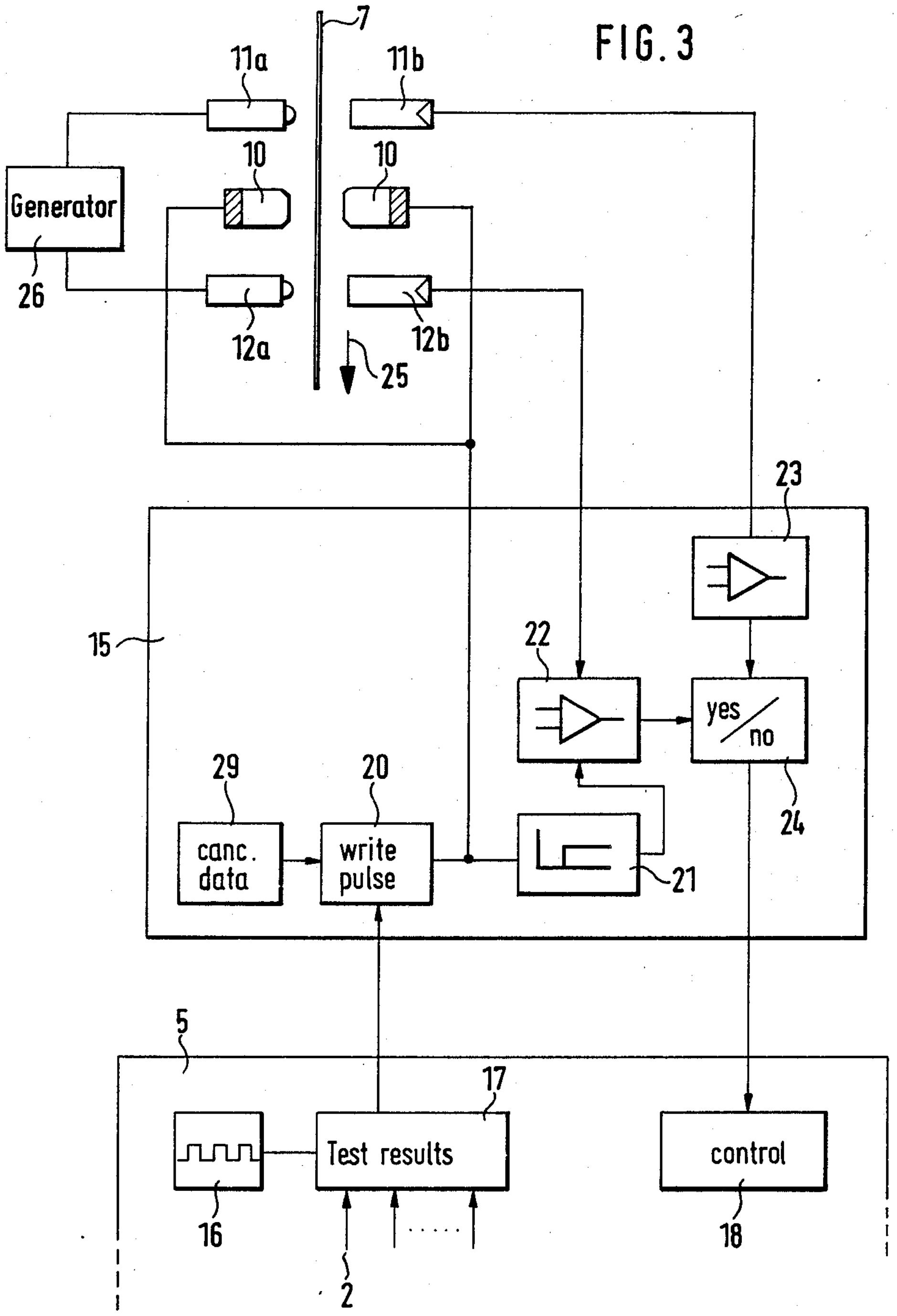
FIG. 3 shows the apparatus of FIG. 2 in a top view with the control circuit

While FIG. 2 is a side view, FIG. 3 is a top view of the apparatus. For reasons of clarity, transport belts 8 have not been shown in this figure. The bank note is referred to as 7. The transport means is indicated by arrow 25. In the direction of transport behind nozzles 10 of the ink jet printer there is a first marking sensor consisting of a light-emitting diode 12*a*, which is driven by a suitable generator 26 and a receiver 12*b* whose output leads to a control circuit 15. The amount of light that passes through the normal unmarked bank note is abruptly interrupted when a cancellation marking appears, since the inks are selected so as to be very opaque or very absorbent of light. For example, if one of the nozzles fails, the signal from marking sensor 12*a*, 12*b* will fall below a certain threshold, which leads via control circuit 15 in conjunction with computer 5 to an immediate shutdown of the transport path, for example.

FIG. 3 illustrates in detail the cooperation between the ink jet printer and the marking sensor. Control circuit 15 is connected with the cancellation means, on the one hand, and with computer 5 of the sorting apparatus, on the other hand.

In computer 5 the test results of sensors 2 are collected and processed in a unit 17. Controlled by a machine clock 16 (a time clock synchronized with the motion of the bank note), a pulse generator 20 for operating ink jet nozzles 10 is always driven when a bank note unfit for circulation has been recognized in unit 17 and this note passes the ink jet nozzles. In the most simple case, pulse generator 20 or cancellation data unit 29 generates a rectangular signal, so that a constant bar code is applied as a marking to the bank note. Depending on the requirements, however, variable data of any extent, such as the date, machine number, serial number, etc., can also be generated in unit 29.

A marking applied to the bank note reaches the marking sensor after a time predetermined by the distance between ink jet nozzle 10 and marking sensor 12*a*, 12*b* and by the transport speed. If the write pulse signal of unit 20 is delayed by this time, which can be effected with an appropriate stage 21, one can detect with a time delay, with the aid of a comparator to which the signal from receiver 12*b* of the marking sensor is also fed, whether the desired marking is actually present on the bank note. Depending on whether or not the marking is present, a decision circuit 24 generates a signal that is fed to a control unit 18 in computer 5. If a marking is lacking, control unit 18 can trigger a great variety of functions, for example a machine stop.

FIG. 3 also shows a second marking sensor which likewise consists of a light-emitting diode 11*a* and an appropriate receiver 11*b* and is disposed before nozzles 10 of the ink jet printer, regarded in the direction of transport. In case this has not already been taken care of by sensors 2, this sensor 11 can detect, for example, that the bank note running into the module does not yet bear any cancellation markings.

The signal from receiver 11*b* is also fed in control unit 15 to a comparator 23 whose threshold or comparison signal corresponds, for example, to the translucency of a proper or unmarked bank note. Finally, the comparator output can also be used, for example, to trigger a machine stop via control unit 18.

In conjunction with first marking sensor 12*a*, 12*b*, second marking sensor 11*a*, 11*b* can detect that proper bank notes have actually been canceled in the cancellation unit.

Figure 4:
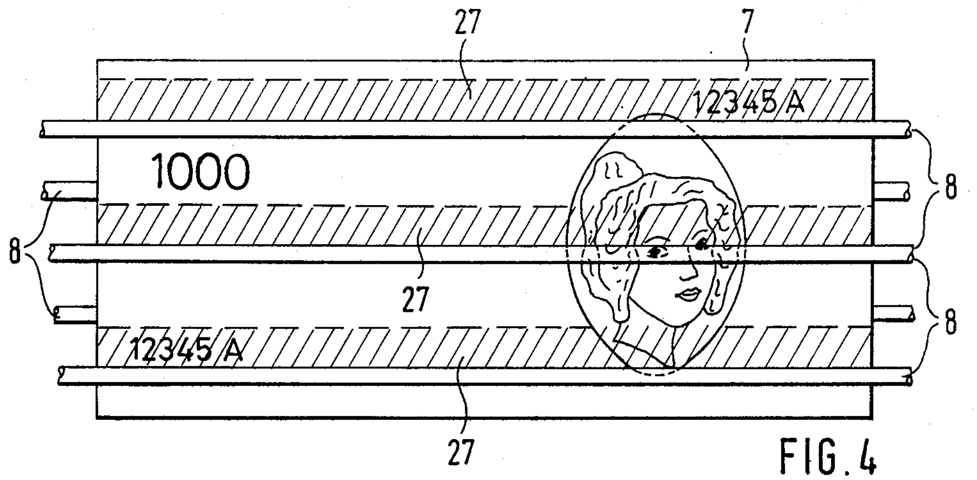
FIG. 4 shows a bank note with areas provided for authenticity testing with transport belts indicated

FIG. 4 shows by way of example a bank note 7 with three parallel, hatched areas 27, which have been selected as cancellation areas in this case and can be printed with markings of any kind. Between the areas there is sufficient room for subsequent authenticity testing, if desired. Transport belts 8 of the transport system holding the bank note are also shown in this figure.

Figure 5:
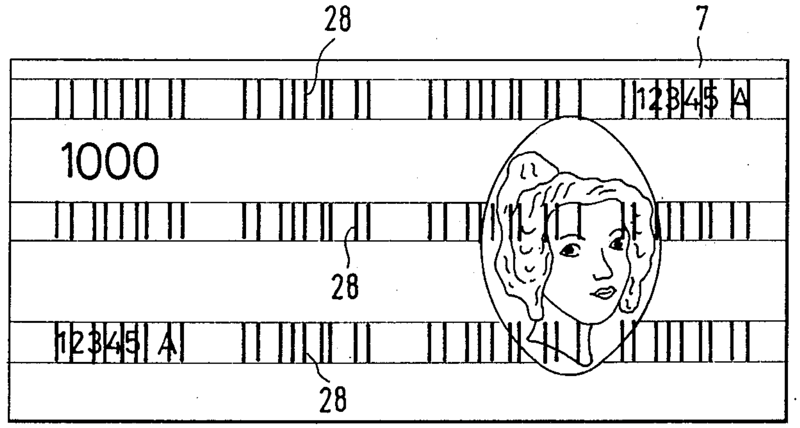
FIG. 5 shows a bank note with a cancellation in the form of a bar code.

Finally, FIG. 5 shows a bank note 7 which has cancellation markings in the form of a bar code 28 along areas 27 in FIG. 4. The bar code can, as already mentioned, contain information on the time and place of cancellation. The canceling machine can also be identified by the bar code, if desired.

The described apparatus can of course also be used, not in a bank note sorting machine, but in a machine for testing newly printed bank notes. It is also possible to set up the apparatus independently. It can also cancel money-value documents other than bank notes in the same way.

What is claimed is:

1. An apparatus for automatically canceling bank notes, comprising a transport system for the singled bank notes and a printing unit integrated into the transport system in the form of an ink jet printer which provides markings on the bank notes to be canceled, characterized by the combination of the following features (a) a marking sensor (12*a*, 12*b*) disposed behind the ink jet printer (10) in the direction of transport of the bank notes for detecting the presence of cancellation markings (28) on the bank notes (7)

(b) a control circuit (15) which initiates the appropriate measures intended for incompletely canceled bank notes when the marking sensor (12*a*, 12*b*) detects a bank note without, or with insufficient, marking (c) a housing (9) surrounding at least the nozzles of the ink jet printer and the marking sensor (12*a*, 12*b*) in such a way as to prevent unauthorized access to the transport area between the ink jet printer (10) and the marking sensor.

2. An apparatus according to claim 1, characterized in that the ink jet printer (10) is preceded by a second marking sensor (11*a*, 11*b*) is disposed whose signal is also fed to the control circuit (15) where it is correlated with the signal associated with the same bank note from the first marking sensor (12*a*, 12*b*).

3. An apparatus according to claim 1, characterized in that the nozzles (10) of the ink jet printer are disposed on each side of the bank note (7).

4. An apparatus according to claim 3, characterized in that the nozzles (10) are disposed on each side of the bank note (7) in such a way that the markings on one side of the bank note at least partly overlap the markings on the other side thereof.

5. An apparatus according to claim 1, characterized in that the housing (9) contains a second set of ink jet nozzles (10) in an arrangement corresponding to the first set of nozzles, and in that this second set of ink jet nozzles can be activated partly or wholly in case of disturbances in the first set.

6. A method for automatically canceling bank notes, the cancellation being performed by an ink jet printer, characterized in that the cancellation marking is applied on at least one side of the bank note and at least along a track, and in that directly after the cancellation operation the bank note is tested as to the presence of markings, whereby the marking and testing are protected from unauthorized access.

7. A method according to claim 6, characterized in that the cancellation markings contain coded information, in particular on the time and place of cancellation.

8. A method according to claim 6, characterized in that the cancellation marking is applied to the bank note in such a way that areas of the bank note which allow for authenticity testing are unmarked.

9. A method according to claim 7, characterized in that the information on the front and back of the bank note is different.

10. A method according to claim 6, characterized in that the ink jet printer is driven in such a way that the markings on one side of the bank note at least partly overlap the markings on the other side thereof.

11. A method according to claim 6, characterized in that the ink jet printer is driven in such a way that the markings have the form of a line, a series of dots or a bar code.

* * * * *